United States Patent [19]

Geelhaar et al.

[11] Patent Number: 5,300,254
[45] Date of Patent: Apr. 5, 1994

[54] FERROELECTRIC LIQUID-CRYSTAL DISPLAY

[75] Inventors: Thomas Geelhaar, Mainz; Axel Pausch, Seeheim; Michael Kompter, Riedstadt-Erfelden; Bernhard Scheuble, Seeheim-Jugenheim, all of Fed. Rep. of Germany

[73] Assignee: Merck Patent Gesellschaft mit beschrankter Haftung, Darmstadt, Fed. Rep. of Germany

[21] Appl. No.: 736,325

[22] Filed: Jul. 26, 1991

[30] Foreign Application Priority Data

Jul. 27, 1990 [DE] Fed. Rep. of Germany ....... 4023867

[51] Int. Cl.$^5$ .............................................. C09K 19/34
[52] U.S. Cl. .......................... 252/299.61; 252/299.01
[58] Field of Search ............ 252/299.01, 299.6, 299.61

[56] References Cited

U.S. PATENT DOCUMENTS

| | | | |
|---|---|---|---|
| 5,024,018 | 4/1993 | Kelly | 252/299.61 |
| 5,030,383 | 7/1991 | Scheuble et al. | 252/299.61 |
| 5,034,151 | 7/1991 | Shinjo et al. | 252/299.61 |
| 5,064,566 | 11/1991 | Hopf et al. | 252/299.61 |
| 5,167,859 | 12/1992 | Wachtler et al. | 252/299.61 |
| 5,190,691 | 3/1993 | Kikuchi et al. | 252/299.61 |
| 5,198,149 | 3/1993 | Reiffenrath | 252/299.61 |
| 5,198,150 | 3/1993 | Takeshita et al. | 252/299.61 |

*Primary Examiner*—Philip Tucker
*Attorney, Agent, or Firm*—Millen, White, Zelano, & Branigan

[57] ABSTRACT

The invention relates to ferroelectric liquid-crystal displays having improved multiplexing capability.

12 Claims, 5 Drawing Sheets

FERROELECTRIC LIQUID-CRYSTAL DISPLAY

SUMMARY OF THE INVENTION

The invention relates to a ferroelectric liquid-crystal display which has improved multiplexing capability and contains a ferroelectric liquid-crystal medium between two plane-parallel plates provided with an electrode matrix of sampling electrodes and data electrodes arranged perpendicular thereto, this medium containing a chiral component comprising one or more chiral dopes, and an achiral base component comprising one or more achiral compounds.

Ferroelectric liquid-crystal displays generally contain liquid-crystal media having chiral tilted smectic C phases ($S_C^*$), which can be obtained by doping an $S_C$ base mixture with a chiral dope (W. Kuczynski, H. Stegemeyer, Chem. Phys. Lett. 70 (1983), 123). These displays are based on the principle of SSFLC (surface stabilized ferroelectric liquid crystal) technology described by Clark and Lagerwall (N. A. Clark and S. T. Lagerwall, Appl. Phys. Lett. 36 (1980), 889; U.S. Pat. No. 4,367,924).

The other requirements of $S_C^*$ phases used in electro-optical displays of this type are:

(i) the $S_C^*$ phase should exist in the broadest possible temperature range around ambient temperature.
(ii) the liquid-crystal compounds forming the $S_C^*$ phase should be chemically stable and pure.
(iii) the material parameters of the liquid crystal, such as, for example, spontaneous polarization P, optical anisotropy $\Delta n$, flow viscosity $\eta$, dielectric anisotropy $\Delta \epsilon$, tilt angle $\theta$ and pitch p should be optimized.

In the case of nematic (N) phases or smectic A ($S_A$) phases, the phase range can generally be extended by preparing a mixture of various N or $S_A$ components, with a moderate phase-transition temperature $T_{N-I}$ or $T_{S_A-I}$, but a melting point which is reduced compared with the mean melting point, frequently being established. This process cannot easily be transferred to $S_C$ phases since a smectic B ($S_B$) phase sometimes induced in the mixture of $S_C$ phases or the $S_C$ phase is limited to a narrow temperature range by a dominating $S_A$ phase. In addition, the range of substances which have an $S_C$ phase with a broad phase range and which are distinguished by high chemical stability and purity is significantly smaller than the pool of nematic compounds, so that the mixing possibilities are considerably restricted.

Thus, the demand for the provision of $S_C$ phases which satisfy requirements (i) and (ii) is not trivial, and the problem of simultaneously satisfying the requirements (i)–(iii) can be regarded as substantially unsolved.

There thus continues to be a considerable demand for mixture concepts which cover the broadest possible range of liquid-crystalline components, not necessarily having an $S_C$ phase, for the provision of liquid-crystalline media having an $S_C$ phase, and which thus considerably broaden the latitude for simultaneously satisfying requirements (i)–(iii).

For the ferroelectric liquid-crystal displays known hitherto, liquid-crystal media are employed which generally have a spontaneous polarization of greater than 10 $nC/cm^2$, since the switching time corresponding to the equation $$\tau \propto \frac{\gamma}{P \cdot E}$$

($\gamma$ = viscosity, $P$ = spontaneous polarization
$E$ = electrical field)

shortens with increasing spontaneous polarization.

An object of the invention is to provide novel ferroelectric liquid-crystal displays having improved multiplexing capability.

Upon further study of the specification and appended claims, further objects and advantages of this invention will become apparent to those skilled in the art.

Surprisingly, it has now been found that these objects can be achieved by the provision of the liquid-crystal displays according to the invention.

The invention thus relates to a ferroelectric liquid-crystal display which has improved multiplexing capability and contains a ferroelectric liquid-crystal medium between two plane-parallel plates provided with an electrode matrix of sampling electrodes and data electrodes arranged perpendicular thereto, this medium containing a chiral component comprising one or more chiral dopants, and an achiral base component comprising one or more achiral compounds, and this medium having a dielectric anisotropy of from $-0.01$ to $-1.2$ and a spontaneous polarization of less than 8 $nC/cm^2$, in particular a liquid-crystal display of this type in which the achiral base component contains at least one compound containing the structural element 2-fluoro-1,4-phenylene, 2,3-difluoro-1,4-phenylene, thia-3,4-diazole-2,5-diyl or 1-cyano-1,4-cyclohexylene.

Preference is furthermore given to liquid-crystal displays in which the achiral base component essentially comprises compounds of components I and II below:

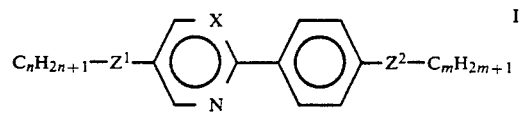

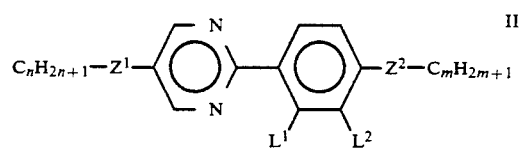

in which n and m are each, independently of one another, from 5 to 12,

X is N or CH, $L^1$ and $L^2$ are H or F, at least one ligand $L^1$ or $L^2$ being different from H, and $Z^1$ and $Z^2$ are —O— or a single bond, in particular in which component I comprises compounds of one or more of the formulae Ia, Ib, Ic and Id:

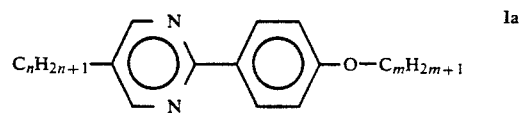

-continued

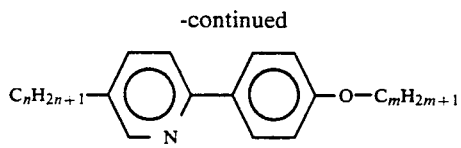   Ib

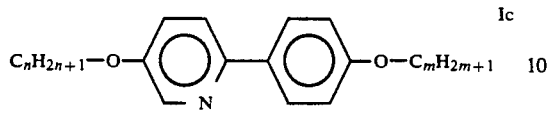   Ic

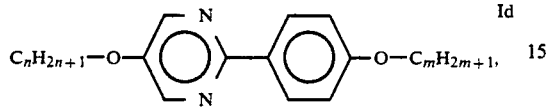   Id and/or components II comprises compounds of one or more of the formula IIa to IIi:

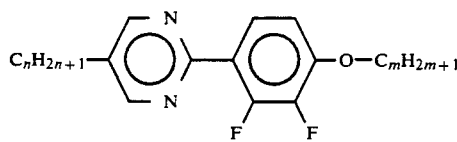   IIa

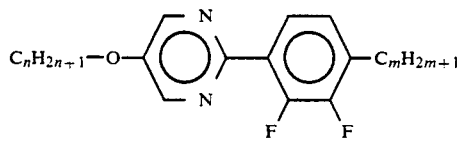   IIb

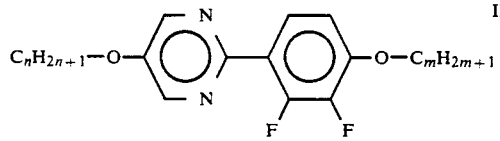   IIc

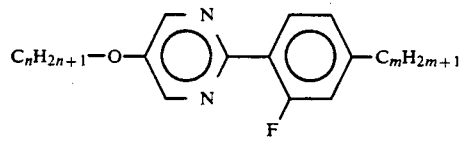   IId

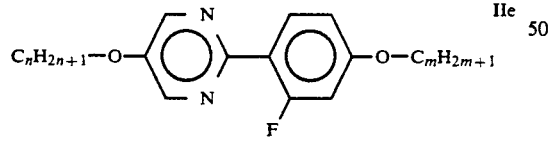   IIe

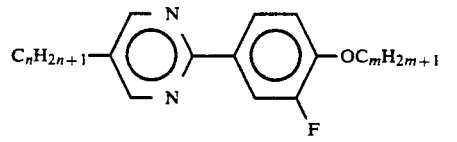   IIf

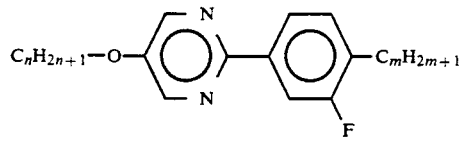   IIg

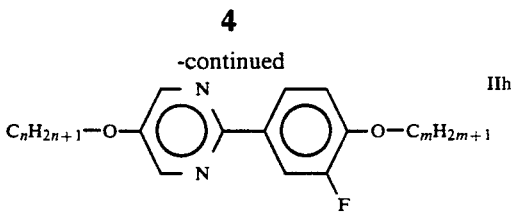   IIh

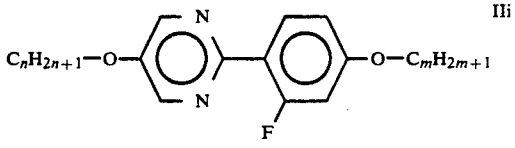   IIi

Furthermore preferred are displays in which the achiral base component contains components I and II in the following proportions by weight:

I ≦ 35%

II 8–50%

Furthermore preferred are displays in which the proportion by weight of the chiral component is from 1 to 25%, in particular in which the chiral component comprises one or more compounds of the formula III:

$$C_nH_{2n+1}-Q-A-B-Q^1-C^*-R^\sigma Y-Q^2-C_mH_{2m+1}$$   III in which n and m are each, independently of one another, from 2 to 12, Q is —O— or a single bond, —A—B— is

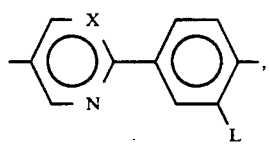,

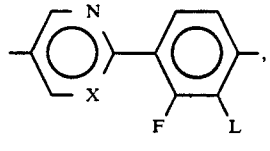,

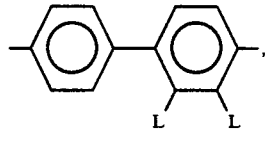,

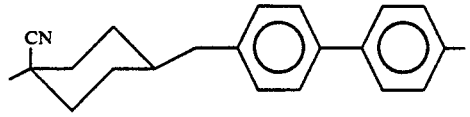

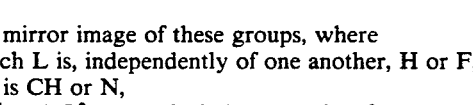

or a mirror image of these groups, where
each L is, independently of one another, H or F,
X is CH or N,
$Q^1$ and $Q^2$ are each, independently of one another, —COO—, —O— or alkylene having 2 to 4 carbon atoms in which, in addition, one $CH_2$ group may be replaced by —O—, —S—, —CO—, —O—CO—, —CO—O—, —S—CO—, —CO—S—, —CH= CH—COO—, —CH=CH—, —CHHalogen— and/or —CHCN—, or are each a single bond, where $Q^1$ is preferably —O—, —CH$_2$CH$_2$— or —OCH$_2$— and $Q^2$ is —COO— or a single bond, Y is halogen, CN, CH$_3$, CH$_2$CN or OCH$_3$, preferably F or CH$_3$, $R^o$ is H or an alkyl group having 1 to 10 carbon atoms which is different from Y and —Q$^2$—C$_m$H$_{2m+1}$, preferably H, and C* is a carbon atom linked to four different substituents.

The liquid-crystal mixture preferably has a spontaneous polarization $P_s$ of greater than 1 nC/cm$^2$.

Furthermore, the liquid-crystal mixture preferably contains at least one chiral dopant. The chiral dopant here preferably has a spontaneous polarization >5 nC/cm$^2$. The liquid-crystal mixture preferably has a slightly negative anisotropy of the dielectric constant ($\Delta\epsilon$). This is preferably between −0.01 and −1.1, in particular between −0.1 and −1.

The physical parameters $\Delta\epsilon$ and P are given for room temperature. At higher or lower temperatures, these parameters change in accordance with their temperature dependency.

Smectic phases are classified in accordance with the textures visible under a polarizing microscope and are known as smectic phases of type A, B, C... All smectic phase types have a parallel position and arrangement of the molecules in layers, but the type of molecular arrangement varies.

A distinction can be made between orthogonal and tilted smectic phases. In orthogonal structures, the longitudinal molecular axes are on average arranged perpendicular to the layer plane, while the molecules in tilted phases are on average tilted to the plane perpendiculars by the tilt angle. Chiral tilted phases are ferroelectric, which means that they have particular importance for SSFLC displays.

In the two orthogonal $S_A$ and $S_B$ phases, the layer separation approximately corresponds to the length of the liquid-crystalline molecules. In the $S_A$ phase, the molecules have significant freedom within the layers for translation and rotation around the longitudinal axis of the molecules. This relatively loose molecular organisation means that the molecule layers are fairly flexible. By contrast, the orthogonal $S_B$ phase, in which the molecules are arranged in hexagonal close packing in the layers, comes under more highly ordered smectic phases.

In the tilted smectic phases, the layer separation is on average less than the length of the liquid-crystalline molecules. Tilted smectic phases include, for example, the $S_C$ phase, which has a relatively low ordering of the molecules within the layers, the more highly ordered liquid-crystalline smectic phases $S_I$ and $S_F$, and the crystalline smectic phases $S_G$, $S_H$, $S_K$ and $S_J$.

More highly ordered smectic phases are very generally characterized in that they have a correlation of the centers of gravity of the molecules in addition to the arrangement of the molecules in layers.

Chiral tilted smectic phases are ferroelectric and can therefore by used as liquid-crystalline media in SSFLC displays. Of the liquid-crystalline tilted chiral smectic phases, the $S_C$* phase is particularly suitable and has therefore also very predominantly been used in displays produced hitherto.

Compounds containing the structural element 2,3-difluoro-1,4-phenylene preferably have an $S_C$ phase; however, it is also possible for compounds of this type having no $S_C$ phase to be used.

The preparation of compounds containing this structural element is described, for example, in DE38 07 801, DE 38 07 823, DE 38 07 803, DE 38 07 870, DE 38 07 819, DE 38 07 861, DE 38 07 871, DE 38 07 802 and DE 38 07 862. Use may also be made here of variants which are known per se, but are not described here in greater detail. If desired, the starting materials can also be formed in situ by not isolating them from the reaction mixture, but instead immediately reacting them further to form the target compounds.

The compound of the achiral base components containing the structural element 2-fluoro-phenylene or 2,3-difluoro-1,4-phenylene is preferably a compound of the formula A

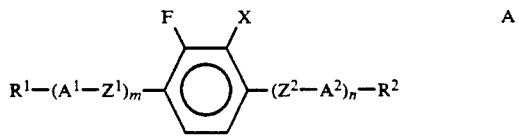

in which $R^1$ and $R^2$ are each, independently of one another, alkyl having 1 to 15 carbon atoms or alkenyl having 3 to 15 carbon atoms, each of which is unsubstituted, monosubstituted by cyano or at least monosubstituted by fluorine or chlorine, it also being possible in each case for one CH$_2$ group in these radicals to be replaced by —O—, —S—, —CO—, —O—CO—, —CO—O— or —O—CO—O—, and one of the radicals $R^1$ and $R^2$ is alternatively a chirality-induced organic radical Q* containing an asymmetric carbon atom, $A^1$ and $A^2$ are each, independently of one another, 1,4-phenylene which is unsubstituted or substituted by one or two F and/or Cl atoms and/or CH$_3$ groups and/or CN groups and in which, in addition, one or two CH groups may be replaced by N, or are each 1,4-cyclohexylene in which, in addition, one or two non-adjacent CH$_2$ groups may be replaced by O atoms and/or S atoms, or piperidine-1,4-diyl, 1,4-bicyclo(2,2,2)-octylene, 1,3,4-thiadiazole-2,5-diyl, naphthalene-2,6-diyl or 1,2,3,4-tetrahydronaphthalene-2,6-diyl, $Z^1$ and $Z^2$ are each, independently of one another, —CO—O—, —O—CO—, —CH$_2$CH$_2$—, —OCH$_2$—, —CH$_2$O—, —C≡C— or a single bond, X is H or F, m and n are each 0, 1 or 2, and (m+n) is 1 or 2.

The compounds of the formula A include bicyclic and tricyclic 2-fluoro- and 2,3-difluoro-1,4-phenylene derivatives. Of the bicyclic compounds, which are preferred, preference is given to those in which $R^1$ is n-alkyl or n-alkoxy having 5-12, in particular 7-10, carbon atoms.

Further preferred are tricyclic compounds of the formula a where m=n=1 or m=0 and n=2.

Preferred compounds of the formula A are described further in DE 38 07 801, DE 38 07 823, DE 38 07 803, DE 38 07 870, DE 38 07 819, DE 38 07 861, DE 38 07 871 and DE 38 07 802.

$R^1$ and $R^2$ are each, independently of one another, preferably alkyl, alkoxy, alkanoyl, alkanoyloxy, alkoxycarbonyl or alkoxycarbonyloxy, in each case preferably having 5 to 12, in particular 6 to 10, carbon atoms. Particular preference is given to alkyl and alkoxy. One of the groups $R^1$ and $R^2$ is preferably alkyl. A particularly preferred combination is $R^1$=alkyl and $R^2$=alkoxy, and furthermore $R^1$=alkoxy and $R^2$=alkyl. Particular preference is given to $R^1$ and $R^2$ groups containing straight-chain alkyl radicals.

Further preferred are compounds of the formula A in which $R^1$ is n-alkyl having 5-13 carbon atoms and $R^2$ is n-alkyl, n-alkoxy, n-alkanoyloxy, n-alkoxycarbonyl or n-alkylthio having 5-11 carbon atoms.

Further preferred are compounds of the formula A as a constituent of the chiral component in which one of the radicals $R^1$ and $R^2$ is a chiral radical $Q^*$ of the formula B

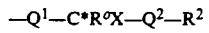

in which $Q^1$ and $Q^2$ are each, independently of one another, alkylene having 2 to 4 carbon atoms in which, in addition, one $CH_2$ group may be replaced by —O—, —S—, —CO—, —O—CO—, —CO—O—, —S—CO—, —CO—S—, —CH=CH—COO—, —CH=CH—, —CHHalogen— and/or —CH-CN—, or are each a single bond, X is halogen, CN, $CH_3$, $CH_2CN$ or $OCH_3$, $R^o$ is H or an alkyl group having 1 to 10 carbon atoms which is different from X and —$Q^2$—$R^2$, and $C^*$ is a carbon atom linked to four different substituents.

The use of one or more compounds of the formula I containing a radical II of this type gives a liquid-crystal medium according to the invention having a chiral $S_C^*$ phase which has ferroelectric properties.

$Q^1$ in formula B is preferably n-alkyl, n-alkoxy, n-alkanoyloxy or n-alkoxycarbonyl having 2-4 carbon atoms. $Q^1$ is furthermore preferably

in which

Y is F, Cl, CN or H and

W is —$CH_2$— or a single bond.

X in formula B is preferably halogen, CN, $OCH_3$, or $CH_3$, but in particular F, Cl, CN, $OCH_3$ or $CH_3$, very particularly $CH_3$.

$R^o$ in formula B is preferably H, n-alkyl or n-alkoxy having 1-3 carbon atoms, but in particular H, $CH_3$ or $CH_3O$, very particularly H.

$Q^2$-$R^2$ in the formula B is preferably n-alkyl or n-alkoxy having 1-5 carbon atoms, but in particular n-alkyl having 1-3 carbon atoms.

Particular preference is given to ferroelectric liquid-crystal displays which contains liquid-crystal media in which the achiral component contains from 60 to 100% by weight, in particular 65 to 80% by weight, of one, two, three or more compounds of the formula I, in particular in which X is N.

The achiral component furthermore particularly preferably contains from 0 to 40% by weight, in particular from 20 to 35% by weight, of one, two, three or more compounds of the formula II, in particular in which $L^1$ and $L^2$ are F.

If the achiral component does not contain a compound containing the structural element 2-fluoro-1,4-phenylene, 2,3-difluoro-1,4-phenylene or 1-cyano-1,4-cyclohexylene, the chiral component contains at least one compound containing one of these structural elements.

Since the switching time $\tau$ of SSFLC displays is inversely proportional to the spontaneous polarization P, liquid-crystal mixtures according to the invention having high spontaneous polarization are preferred. P is preferably greater than 1 $nC/cm^2$, but in particular greater than 5 $nC/cm^2$ and very particularly between 6 and 8 $nC/cm^2$.

The liquid-crystal media used in the liquid-crystal displays according to the invention must have ferroelectric properties. This can be achieved by one or more components of the liquid-crystal medium having a chiral center, and/or by adding one or more chiral dopants to the $S_C$ base medium. The dopants may be mesogenic or nonmesogenic, but in this case preferably have a structure similar to liquid-crystal molecules. The use of chiral dopants of high spontaneous polarization P is preferred, since this allows the spontaneous polarization to be modified virtually independently of other properties of the medium, such as, for example, the phase range, viscosity, etc. Preference is given to chiral dopants whose spontaneous polarization P is greater than 10 $nC/cm^2$.

Preference is given to liquid-crystal displays with multiplexing capability which are based on the principle of SSFLC technology. In these systems, the smectic layers are arranged perpendicular to the plates of the cell. The helical arrangement of the tilt directions of the molecules is suppressed by a very small separation of the plates (about 1-2 $\mu$m). This forces the longitudinal axes of the molecules to arrange in a plane parallel to the plates of the cell, giving two preferential tilt orientations. Application of a suitable electrical alternating field allows switching back and forth between these two states in the liquid-crystalline phase having spontaneous polarization. This switching operation is significantly faster than in conventional twisted cells (TN-LCDs) based on nematic liquid crystals.

Such ferroelectric liquid-crystal displays with multiplexing capability are described, for example, by S. Shimoda et al. in Proceedings of SID, Vol. 28/2 1987, 201-204, and in EP 0 366 117, EP 0 367 531, EP 0 370 649 and EP 0 374 865.

Further preferred are liquid-crystal displays according to the invention in which a liquid-crystalline polymer composition is used comprising a ferroelectric liquid-crystalline polymer and a low-molecular-weight liquid-crystalline medium having an $S_C$ or $S_C^*$ phase. Similar electrooptical systems are described, for example, in EP 0 297 554.

The displays according to the invention are produced in a manner which is conventional per se. In general, the components are dissolved in one another, expediently at elevated temperature, and the liquid-crystal medium is introduced into the display in a manner which is known per se, for example as described by K. Iwasa JEE, September 1986, 33-37.

The ferroelectric liquid-crystal displays used in the examples below have the following addressing schemes (cf. FIG. 1):

idealized "Bipolar Pulse", —A— matrix addressing scheme as described by S. Shimoda et al., Proceedings of SID, Vol. 28/2, 1987, —B— and —C—

AC field-stabilized matrix addressing scheme as described by T. Umeda et al., Japanese Journal of Applied Physics 27 (7) 1988, 1115-1121, —D— and —E—.

Figure 4:
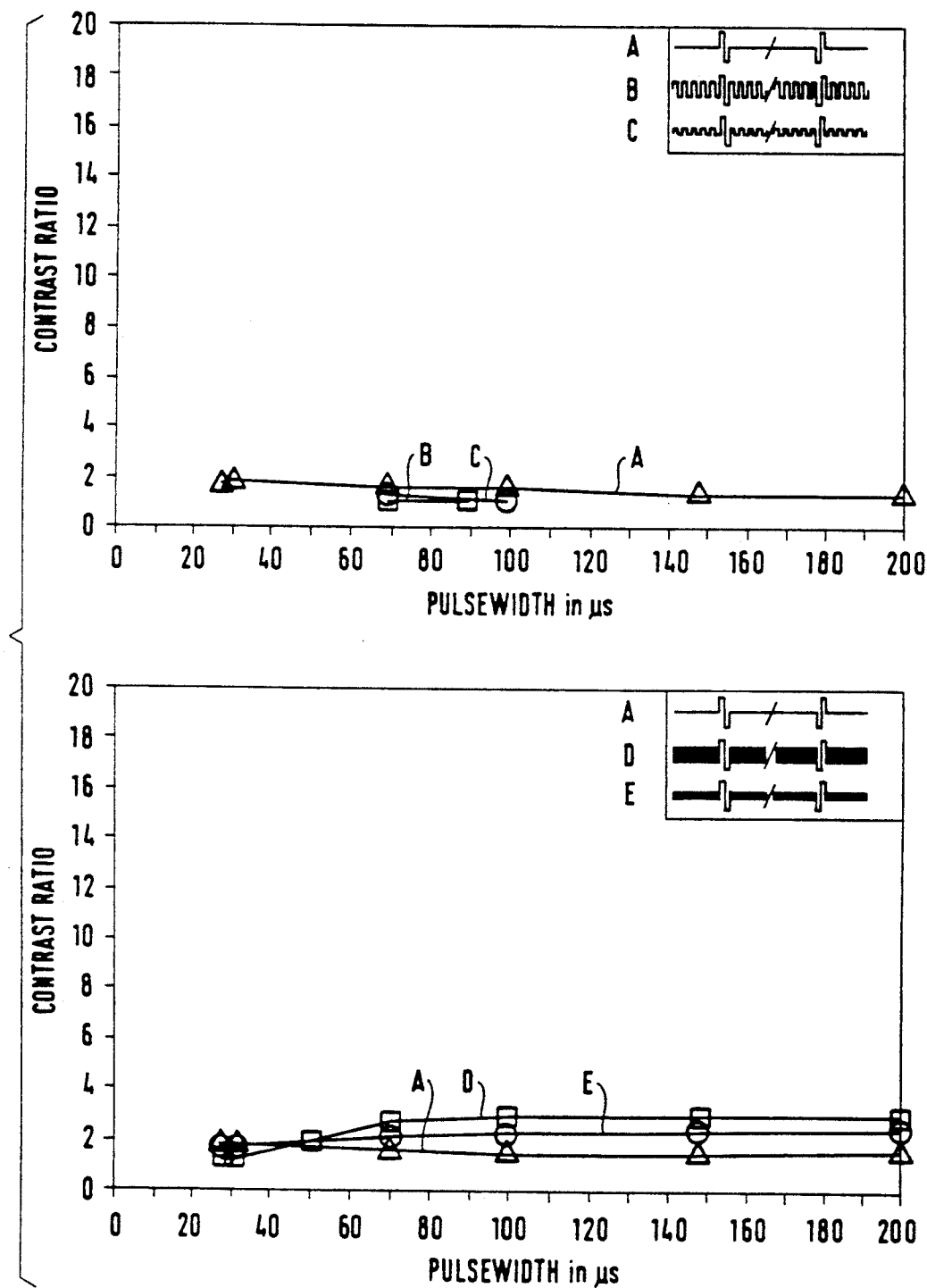
FIG. 4 and FIG. 5 shows the contrast ratio as a function of the pulse width of the liquid-crystalline medium from Comparative Examples 1 and 2 for various addressing schemes A-E.
Figure 5:
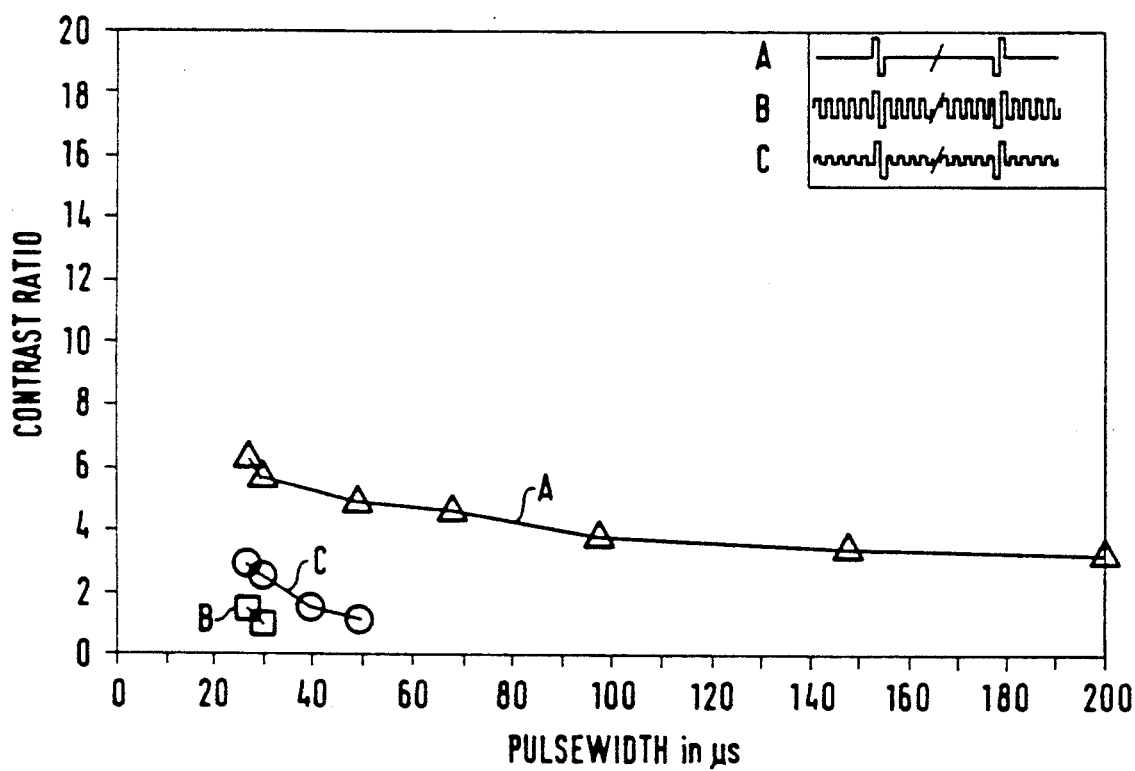

The reduced contrast ratio in the two comparative examples (in FIG. 4 and FIG. 5) can clearly be seen. In addition, these liquid-crystal displays have a significantly reduced pulse width range for addressing schemes B-E.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, and of corresponding German Application P 40 23 867.9, filed Jul. 27, 1990, are hereby incorporated by reference.

EXAMPLES

The following compounds are used in the liquid-crystalline mixtures below:

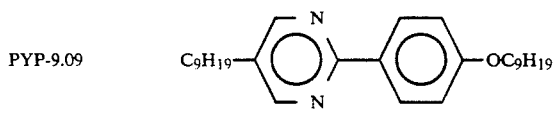

PYP-9.09

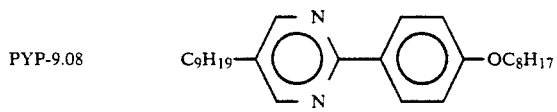

PYP-9.08

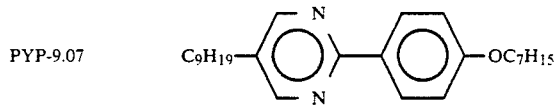

PYP-9.07

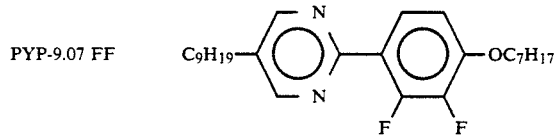

PYP-9.07 FF

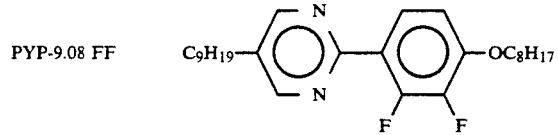

PYP-9.08 FF

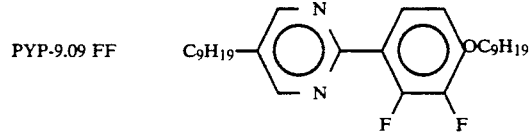

PYP-9.09 FF

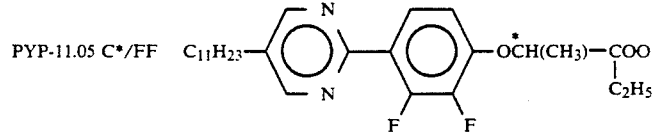

PYP-11.05 C*/FF

-continued

PYP-7.08 F*/FF 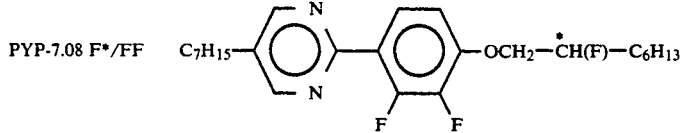

PYRP-7.09 F* 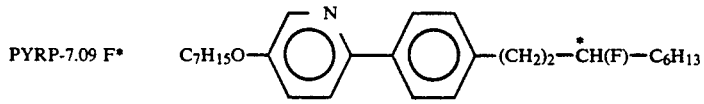

NCB-7.08 F* 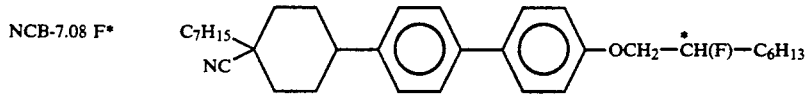

EXAMPLE 1 FOR LIQUID-CRYSTALLINE MEDIA

A liquid-crystalline medium is prepared which comprises

| % by wt | |
|---|---|
| 31.66 | PYP-9.09 |
| 31.66 | PYP-9.08 |
| 31.66 | PYP-9.07 and |
| 5.00 | NCB-7.08 F* |

Figure 1:
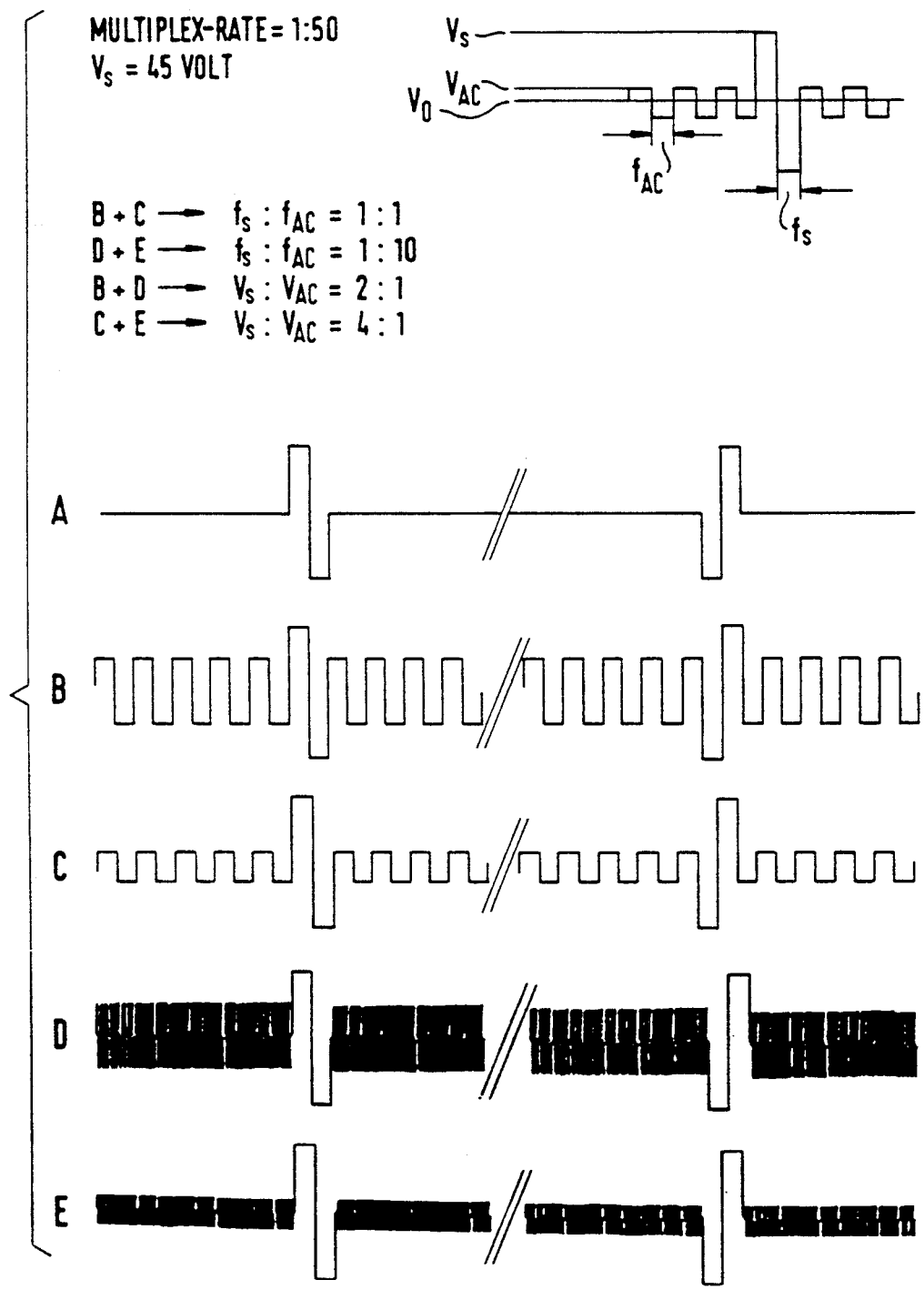
FIG. 1 shows the ratios between the respective signal frequency $f_s$ and the frequency of the AC field $f_{AC}$, and the ratio between the signal voltage $V_s$ and the AC stabilisation voltage $V_{AC}$.
Figure 2:
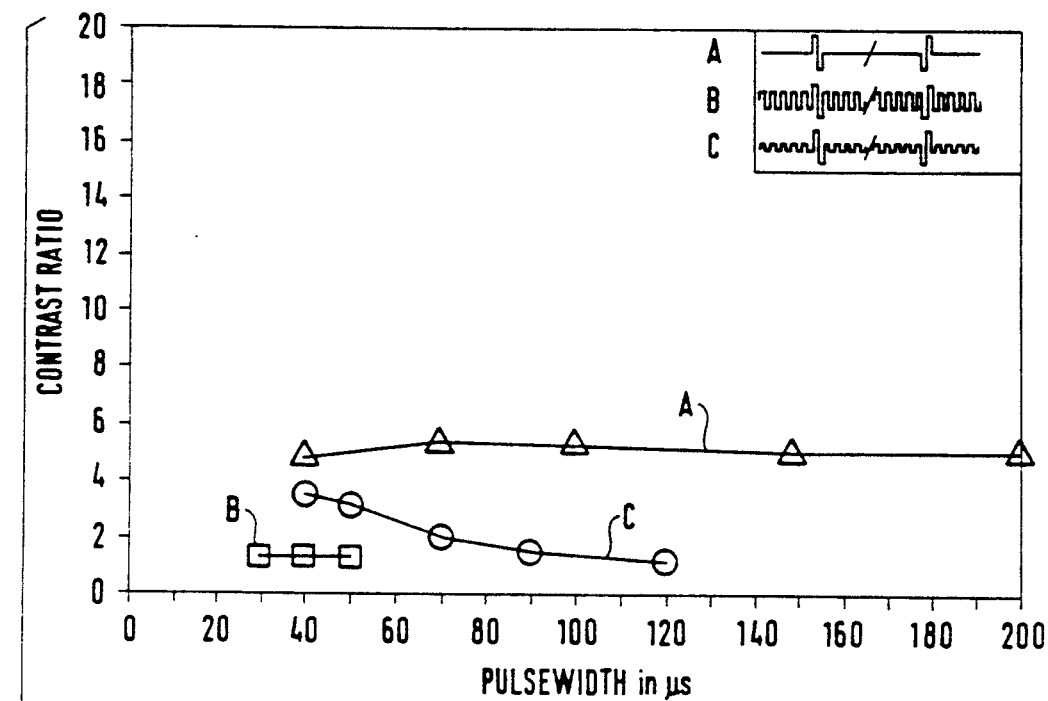
FIG. 2 shows the contrast ratio (between an addressed pixel and a non-addressed pixel) as a function of the pulse width (in μs) of the liquid-crystalline medium from Example 1 for various addressing schemes A-E.
Figure 2:
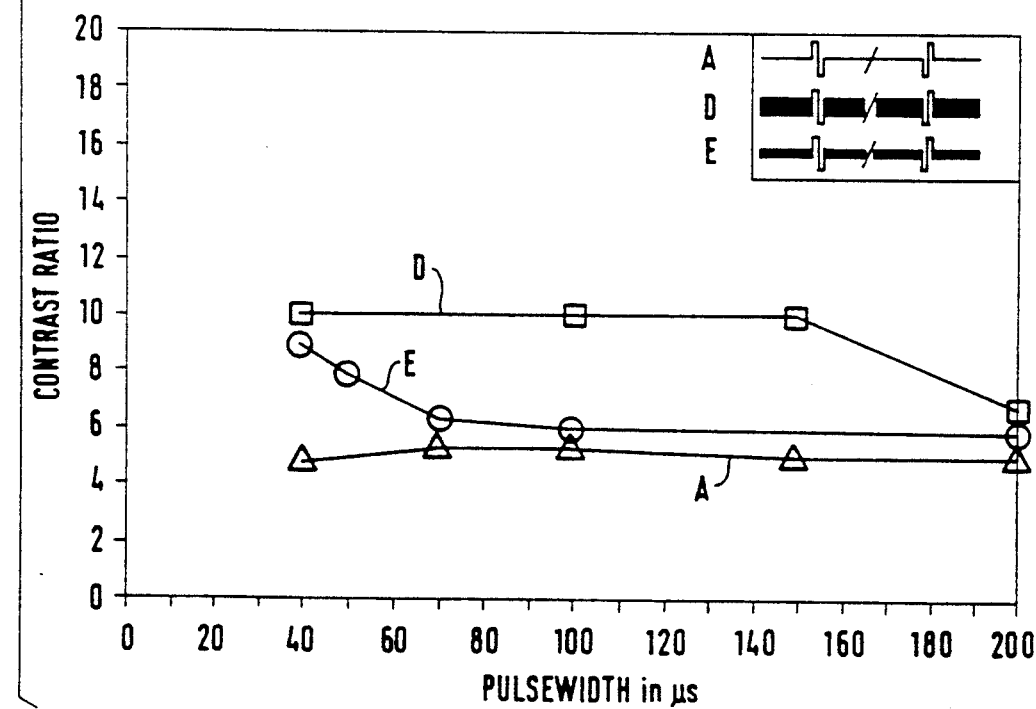

Phase sequence: $S_C^*$ 65 $S_A$ 73 Ch 74 I
$\Delta\epsilon = -0.07$, P=5.5 nC.cm$^{-2}$ Ferroelectric liquid-crystal displays containing this medium have a high multiplexing capability (cf. FIG. 2).

EXAMPLE 2 FOR LIQUID-CRYSTALLINE MEDIA

A liquid-crystalline medium is prepared which comprises

| % by wt | |
|---|---|
| 23.75 | PYP-9.09 |
| 23.75 | PYP-9.08 |
| 23.75 | PYP-9.07 |
| 7.916 | PYP-9.09 FF |
| 7.916 | PYP-9.08 FF |
| 7.916 | PYP-9.07 FF |
| 5.00 | NCB-7.08 F* |

Figure 3:
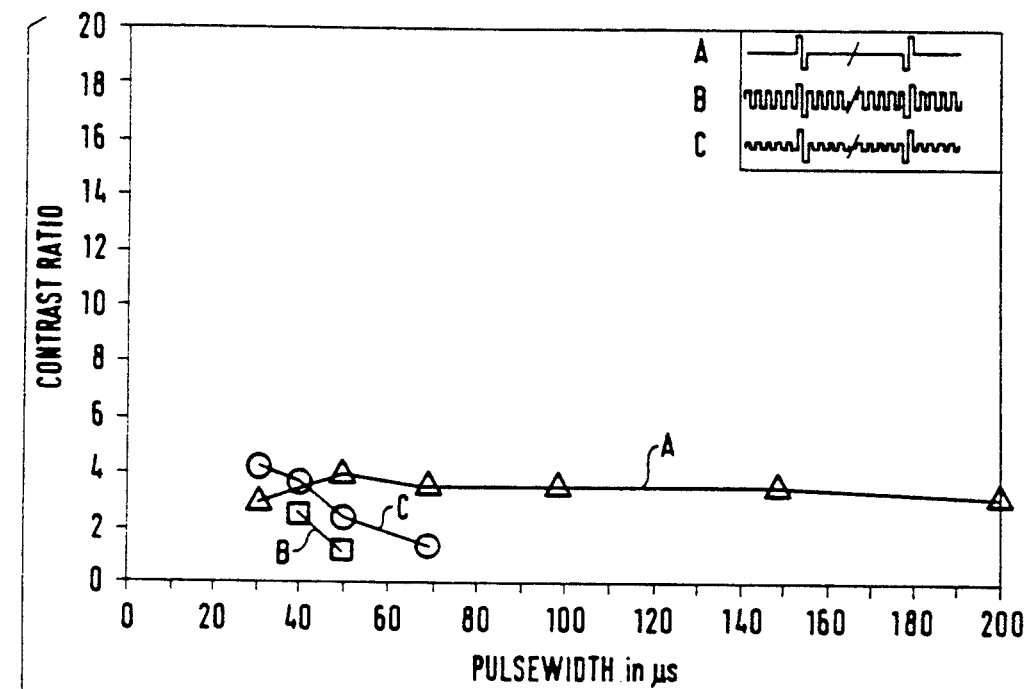
FIG. 3 shows the contrast ratio as a function of the pulse width of the liquid-crystalline medium from Example 2 for various addressing schemes A-E.
Figure 3:
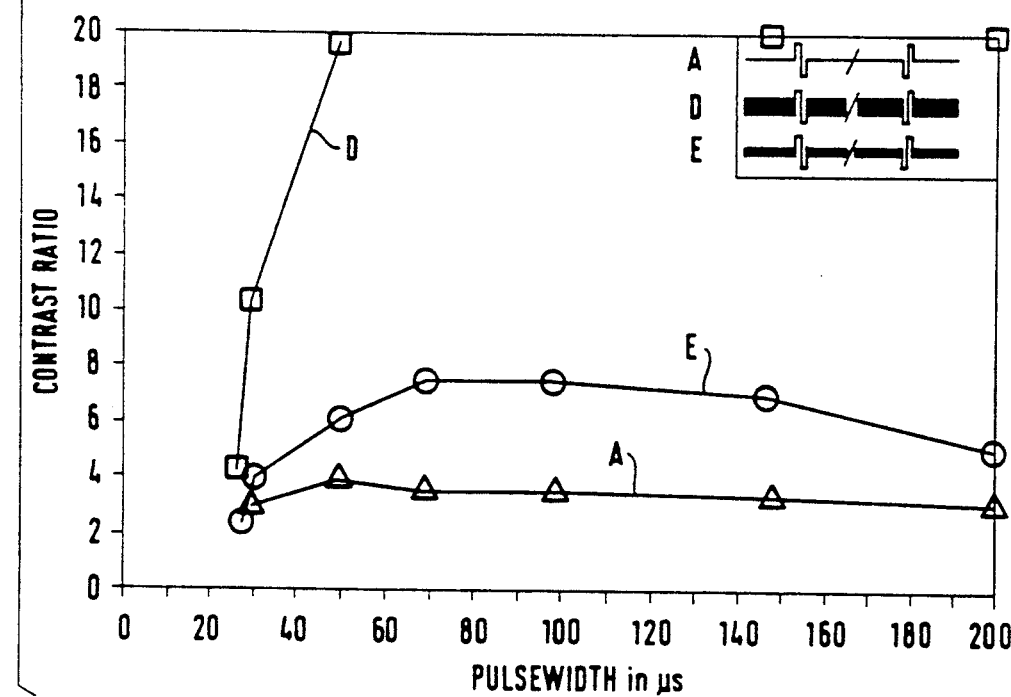

Phase sequence: $S_C^*$ 65 $S_A$ 68 Ch 70 I
$\Delta\epsilon = -0.9$, P=7.0 nC.cm$^{-2}$ Ferroelectric liquid-crystal displays containing this medium have a high multiplexing capability (cf. FIG. 3).

COMPARATIVE EXAMPLE 1 FOR LIQUID-CRYSTALLINE MEDIA

A liquid-crystalline medium is prepared which comprises

| % by wt | |
|---|---|
| 15.8 | PYP-9.09 |
| 15.8 | PYP-9.08 |
| 15.8 | PYP-9.07 |
| 15.8 | PYP-9.09 FF |
| 15.8 | PYP-9.08 FF |
| 15.8 | PYP-9.07 FF |
| 5.00 | NCB-7.08 F* |

Phase sequence: $S_C^*$ 63 $S_A$ 64 Ch 65 I
$\Delta\epsilon = -1.8$, P=8.0 nC.cm$^{-2}$ Liquid-crystal displays containing this medium have a low multiplexing capability (cf. FIG. 4).

COMPARATIVE EXAMPLE 2 FOR LIQUID-CRYSTALLINE MEDIA

A liquid-crystalline medium is prepared which comprises

| % by wt | |
|---|---|
| 21.25 | PYP-9.09 |
| 21.25 | PYP-9.08 |
| 21.25 | PYP-9.07 |
| 7.08 | PYP-9.09 FF |
| 7.08 | PYP-9.08 FF |
| 7.08 | PYP-9.07 FF |
| 15.00 | NCB-7.08 F* |

Phase sequence: $S_C^*$ 68 $S_A$ 71 Ch 74 I
$\Delta\epsilon = -1.25$, P=20.0 nC.cm$^{-2}$ Liquid-crystal displays containing this medium have a low multiplexing capability (cf. FIG. 5).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A ferroelectric liquid-crystal display having improved multiplexing capability comprising:
   a ferroelectric liquid-crystal medium between two plane-parallel plates provided with an electrode matrix of sampling electrodes and data electrodes arranged perpendicular thereto;
   said medium containing a chiral component comprising one or more chiral dopants and an achiral base component comprising one or more achiral compounds;

said medium having a dielectric anisotropy of −0.01 to −1.2 and a spontaneous polarization of less than 8 nC/cm²;

wherein said achiral base component contains at least 35 wt. % of one or more compounds of formulae Ia, Ib, Ic and Id:

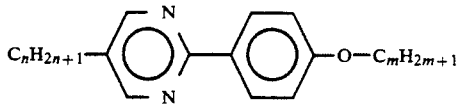
Ia

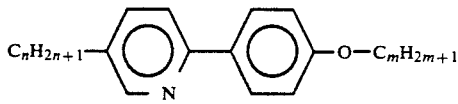
Ib

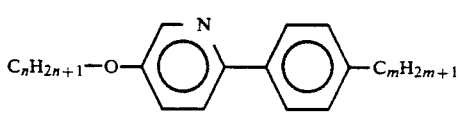
Ic

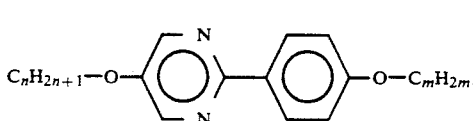
Id wherein n and m are each, independently, 5–12, and said achiral base component contains 8–50 wt. % of at least one compound of formula II:

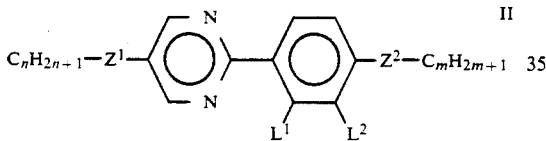
II wherein
n and m are each, independently, 5–12;
L¹ and L² are each, independently, H or F, with at least one ligand L¹ and L² being different from H; and
Z¹ and Z² are each, independently, —O— or a single bond; and
said chiral component contains 1–25 wt. % of one or more compounds of formula III $C_nH_{2n+1}$—Q—A—B—A¹—C*R°Y—Q²—$C_mH_{2m+1}$     III wherein
n and m are each, independently, 2–12;
Q is —O— or a single bond;

—A—B— is

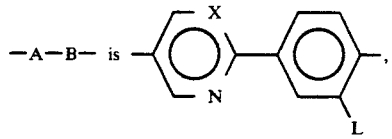

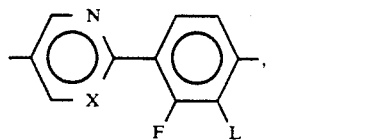

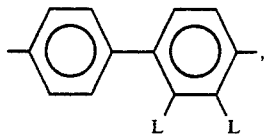

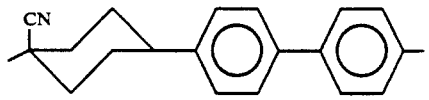

or a mirror image thereof;

each L is, independently of one another, H or F;
X is CH or N;
Q¹ is —O—, —CH₂CH₂— or —OCH₂—;
Q² is —COO— or a single bond;
Y is F; and
R° is H.

2. A display according to claim 1, wherein said compounds of formula II are selected from formulae IIa–IIi:

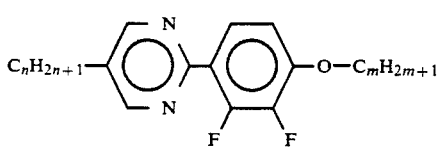
IIa

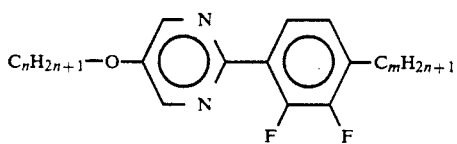
IIb

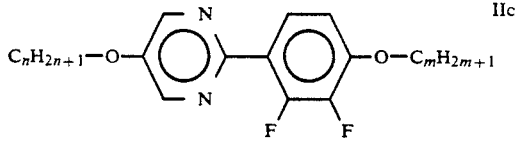
IIc

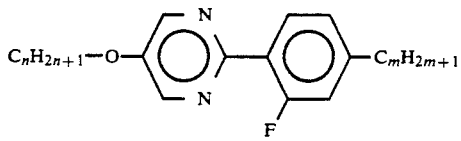
IId

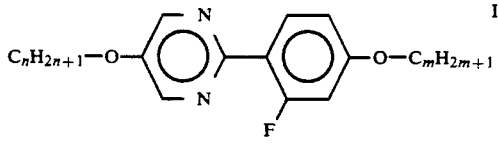
IIe

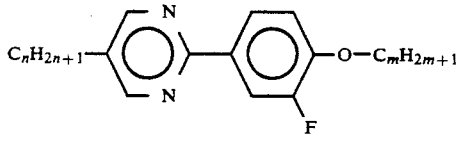
IIf

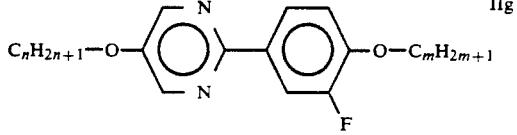
IIg

-continued

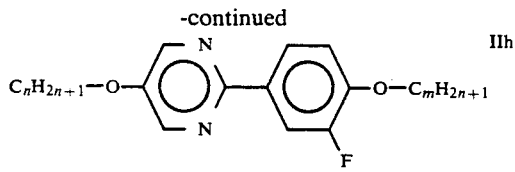

3. A liquid-crystal display according to claim 1, wherein said medium has a spontaneous polarization of greater than 1 nC/cm².

4. A liquid-crystal display according to claim 1, wherein said medium has a dielectric anisotropy of −0.1 to −1.

5. A display according to claim 1, wherein m is 2–8 in formula III.

6. A liquid-crystal display according to claim 1, wherein said achiral base component contains 65–80 wt % of at least one compound of formula Ia or Ib, and 0–40 wt % of at least one compound of formula II, wherein $L^1$ and $L^2$ are F.

7. A display according to claim 1, wherein said mixture contains 2 or more compounds selected from formulae Ia–Id.

8. A display according to claim 1, wherein said medium contains compounds selected from formulae Ia and Id.

9. A display according to claim 1, wherein said medium has a spontaneous polarization of greater than 5 nC/cm².

10. A display according to claim 1, wherein smectic layers are arranged perpendicular to said plates of said cell and helical arrangement of the tilt-directions of the molecules is suppressed by the separation distance of the plates, thereby forcing the longitudinal axes of the molecules to arrange in a plane parallel to said plates of said cell.

11. A display according to claim 1, wherein said display exhibits an AC field-stabilized matrix addressing means.

12. A display according to claim 1, wherein said medium comprises the following compounds:

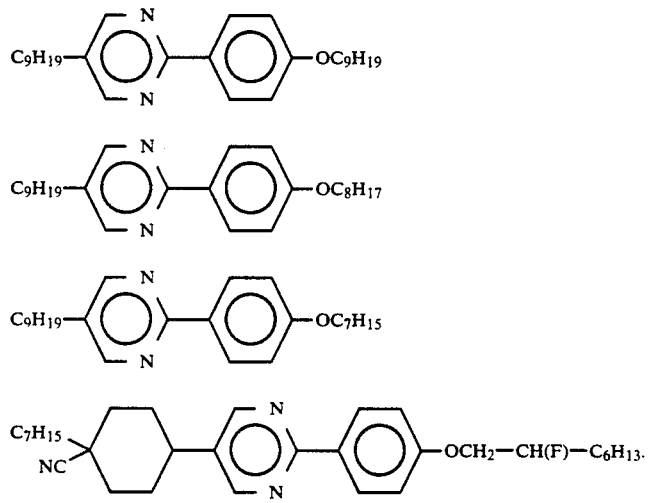

* * * * *